Nov. 23, 1971     T. H. OSTER     3,621,822
INDUCTION MOTOR DRIVEN COOLING FAN
Filed May 20, 1970
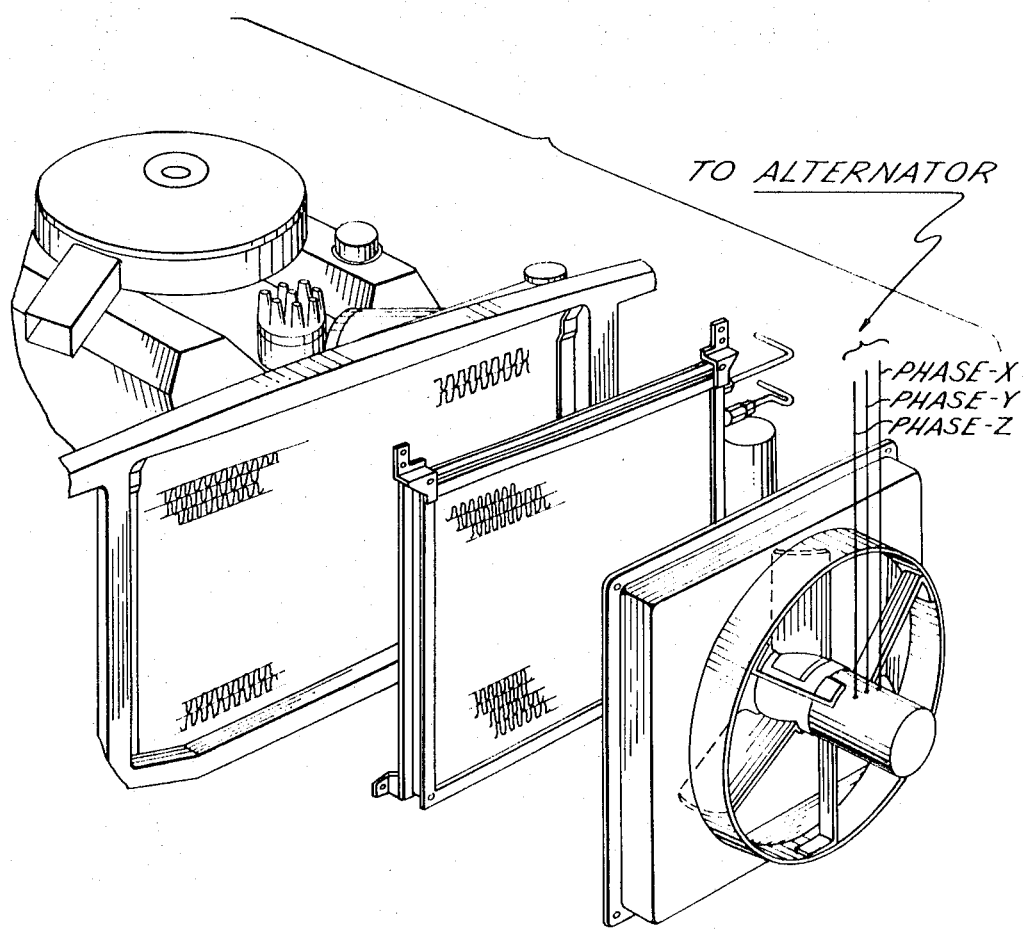
INVENTOR
THOMAS H. OSTER
BY
John R. Faulkner
Thomas H. Oster
ATTORNEYS 3,621,822
INDUCTION MOTOR DRIVEN COOLING FAN
Thomas H. Oster, Dearborn, Mich., assignor to Ford
 Motor Company, Dearborn, Mich.
Filed May 20, 1970, Ser. No. 39,054
Int. Cl. F01p 5/02, 5/04, 7/08
U.S. Cl. 123—41.12                              1 Claim

ABSTRACT OF THE DISCLOSURE

This invention relates to an internal combustion engine system in which the cooling fan is driven by an induction electric motor rather than mechanically by the engine. This induction motor is a poly phase induction motor and is driven by direct electrical connection to the alternator which normally supplies electric power to vehicular components. The induction motor includes squirrel cage rotor conductors mounted on the rotor and deeply buried in the rotor to enhance the reactivity of the motor at high slips.

IN RETROSPECT

Vehicular prime movers have evolved almost exclusively into liquid fuel burning internal combustion engines. The usual automotive internal combustion engine rejects approximately one third of the fuel energy to the water in the cooling jacket and hence to the atmosphere through a radiator. In the usual case the capability of the radiator is increased by the use of a fan driven by the engine and located back of the radiator. The fan is particularly necessary at idling and low speed because under these conditions the effect of ram air is absent or minimal. At high speeds the fan is unnecessary and may even impede cooling. At such high speeds the effect of the ram air is more than enough to provide adequate cooling.

In view of these facts and the fact that the energy required to drive any fan in still air varies roughly as the cube of the speed of the fan, the suggestion has often been put forward to drive the fan electrically rather than directly from the engine. In this way the small amount of energy expended through the electric motor driving the fan is capable of cooling the prime mover under idling and low speed conditions and reliance is placed upon ram air cooling to dissipate the large amounts of heat rejected under high speed operating conditions.

This invention is intended as an improvement upon the previously known electric drive cooling systems.

THE INVENTION

The instant invention is applicable to vehicular internal combustion engines generally, but is particularly useful under the aggravated thermal requirements imposed by the installation of an air conditioning condenser adjacent to the usual radiator. The electrically driven cooling fan upon which this invention depends operates at all times the internal combustion engine is operating. This invention is best understood by reference to the sole figure of drawing.

This figure of drawing is deemed to be almost self-explanatory and shows an exploded view of the cooling system of this invention. In this figure reading from right to left and in the vehicle from the front to rear are shown the electric motor and fan, the air conditioning condenser, the cooling radiator and the internal combustion engine. The fan is shown as a three bladed airfoil device although as a matter of convenience either a one or two bladed fan may be substituted. Typically the diameter of the fan should be about eighteen inches.

This fan is driven by a three phase induction motor solidly connected electrically to the three phase alternator which occurs on all vehicles commercially produced at the present time. The three electrical connections to the motor have been marked Phase X, Phase Y and Phase Z to indicate the connection to the similar phases of the alternator. These connections are to be made to the alternator prior to the rectifier so that the fan motor sees only a conventional three phase alternating voltage. This alternating voltage is regulated to give a constant 12 to 15 volts for battery charging after rectification, and is essentially independent of the speed of the alternator and the speed of the prime mover. In the preferred form of this invention no switching mechanism is interposed between the alternator and the fan motor. Thus the fan motor starts and stops with the prime mover.

Ram air is ordinarily more than sufficient to cool the vehicle radiator and air conditioning condenser at speeds above thirty miles per hour. The necessity for additional cooling from the fan occurs at idling and low speeds. The normal engine driven fan often impedes cooling at higher speeds. Accordingly the fan motor and fan should be designed in conjunction with the alternator to effectively provide cooling at low speeds and become ineffective at high speeds.

This condition may be attained by taking advantage of the fact that automotive alternators are essentially constant voltage machines, but operate at a frequency which varies directly with the engine speed. This characteristic of the alternator must be considered in conjunction with the characteristic of the fan of requiring a torque which is directly proportional to the square of the speed of operation and an energy input which varies as the cube of the speed. A further factor for consideration is that the air stream to which the fan is exposed when mounted directly in front of the radiator is only about one half of vehicle speed in still air.

These conditions may be met by modifying the conventional three phase squirrel cage induction motor by burying the rotor conductor bars deeply in the rotor rather than adjacent the periphery in accordance with usual commercial practice. This produces a highly reactive motor. As the load and the slip of this motor increases, the frequency of the currents in the rotor increase and shunt most of the flux away from the buried conductors. This effect coupled with the inherent characteristic of induction motors of exhibiting a maximum torque which varies inversely with the square of the applied frequency makes it possible to produce a fan motor combination which will cool effectively up to any desired motor speed and then magnetically effectively decouple and unload the motor. This magnetic decoupling effectively prevents electrical overloads of either the alternator or the fan motor.

A conventional automotive alternator produces a frequency of about sixty cycles per second under idling conditions. At this frequency, a four pole fan motor would drive the fan at 1800 r.p.m. less slip or about 1700 r.p.m. At thirty miles per hour this same alternator would produce a frequency of about one hundred fifty cycles per second. At idling the pitch of the fan blades is chosen to produce an air velocity of between 20 and 25 feet per second. As the vehicles accelerates the speed of the fan would tend to increase, but at a lesser rate than the vehicle and alternator frequency. However, the fan is aided by the ram air stream which at thirty miles per hour would be about 22 feet per second. The fan motor combination need only be engineered to produce acceptable cooling to about thirty miles per hour and reliance placed upon ram air at higher speeds.

The fact that at higher speeds the high frequency produced by the alternator the fan will tend to speed up is useful in that the more rapidly rotating blade will not tend to interfere with the passage of ram air.

I claim as my invention:

1. An internal combustion engine system, which includes an internal combustion engine, a cooling radiator, a cooling fan located adjacent the radiator and an electric motor for driving the cooling fan, said electric motor being a polyphase induction motor and being directly electrically connected to the polyphase alternating current output of the internal combustion engine driven alternator, said induction motor including squirrel cage conductors mounted on the rotor, said squirrel cage rotor conductors being deeply buried in the rotor to enhance the reactivity of the motor at high slips.

References Cited

UNITED STATES PATENTS

| | | | |
|---|---|---|---|
| 1,389,395 | 8/1921 | Stuart | 123—44.12 |
| 2,452,007 | 10/1948 | Weybrew | 123—44.12 UX |
| 2,687,123 | 8/1954 | Parsons | 123—139 E UX |
| 3,236,221 | 2/1966 | Lear | 123—139 E UX |
| 2,417,591 | 3/1947 | Du Rostu | 123—41.12 |
| 3,394,682 | 7/1968 | Bensinger | 123—41.12 |

AL LAWRENCE SMITH, Primary Examiner

U.S. Cl. X.R.

123—41.11, 41.49